UNITED STATES PATENT OFFICE.

JACOB BLUMER, OF BROOKLYN, AND CHARLES SCHLAGENHAUFER, OF NEW YORK, N. Y.

METHOD OF MAKING YEAST.

SPECIFICATION forming part of Letters Patent No. 474,943, dated May 17, 1892.

Application filed October 2, 1891. Serial No. 407,490. (No specimens.)

*To all whom it may concern:*

Be it known that we, JACOB BLUMER, a citizen of the United States, residing at Brooklyn, in the county of Kings and State of New York, and CHARLES SCHLAGENHAUFER, a subject of the Emperor of Austria-Hungary, residing at New York city, in the county and State of New York, have invented a certain new and useful Improvement in the Method of Making Yeast, of which the following is a specification.

The object of our invention is to manufacture yeast, and especially compressed yeast, from cereals or other starch-bearing substances in such a manner that only those parts of the cereals are used which are soluble in water, or in water containing small amounts of acids or alkalies and at a low temperature, preferably below 50° centigrade, while the remaining parts of the cereals stay unchanged and may be used for other purposes. The extract of these soluble parts in water we employ sterilized, and we use after sterilization no malt or other material which might infect the extract in which we grow the yeast. Thus working with clear and sterilized solutions we are able to produce a pure and healthy yeast and to avoid the sources of nearly all the calamities accompanying the present mode of making yeast, which is apt to introduce infection through the grain and malt.

The following is a full description of our method of manufacturing compressed yeast: The cereals are reduced to small fragments, either dry or wet, by mills, crushing-rollers, or other suitable appliances. Then they are mixed with a suitable liquid—such, for example, as water, or water and slop, resulting in our process, as hereinafter mentioned, or with diluted solutions of alkali or acids—and treated for a suitable time and at a temperature not high enough to gelatinize the starch or to change it in any way. The most suitable temperature to perform the extraction will be from about 10° to 15° centigrade, and in no case must it be above 50° centigrade. Suppose, for example, that we take corn. This contains, on an average, about fifty-eight per cent. of starch, eight per cent. of sugar and dextrine, ten per cent. of albuminous substances, five per cent. of fatty substances, three and one-half per cent. of fiber, two and one-half per cent. of mineral substances, and thirteen per cent. of water. Of these constituents the sugar, dextrine, a part of the albuminous substances, and a part of the mineral salts are readily soluble at a temperature below 50° centigrade, while the starch is not thus soluble and will be left intact. From six per cent. to eleven per cent., by weight, of corn is soluble by our treatment, and the concentration of the extract obtained will depend on the comparative amount of corn and water used. After the greater part or a sufficient part of the soluble matter—that is, sugar, dextrine, nitrogenous substances, and mineral salts—has been extracted from the cereals the liquid extract is separated from the remaining material. This may be done by filtering-presses, centrifugal machines, or any other apparatus suitable for the purpose. In case the extract should be too diluted it may be put on new material again in place of water or other solutions, and this may be done as many times as necessary to get a final extract of a desired concentration. It is this extract, containing no starch, since starch is not soluble under the circumstances arising during our treatment, which we use for our method. It contains only substances which heretofore have been wasted or were of very little value. The remaining part of the cereals, containing still all the starch of the original material, may enter into the manufacture of starch, glucose, spirit, &c., and has hereinafter no connection whatever with our process. The extract or solution is then placed in a suitable vessel and heated to from 60° to 130° centigrade or more in order to sterilize the liquid. In doing this a part of the substances in solution—namely, that part of the soluble albuminous substances which coagulate at temperatures above 50° centigrade—will coagulate, and the coagulum has to be separated from the clear solution by some filtering or other suitable process, such as the use of centrifugal machines or by decanting nutritious feed for animals. The clear wort, when separated from the coagulum, is cooled to about 25° to 35° centigrade and is mixed with a small amount of mother yeast and fermented. The fermentation has to be conducted carefully, keeping the wort at a temperature of between 25° and 35° centigrade and agitating the liquid by suitable appliances. It will be seen that the wort is fermented by itself—that is, it is not mixed with malt or other substances, except the small amount of yeast used to set up fermentation. After the lapse of a certain time the extract or wort is fermented and all the yeast formed, when the liquid is cooled down to about 15° centigrade and the yeast allowed to settle to the bottom of the containing-vessel. As soon as the liquid appears clear it is drawn off carefully. The remaining yeast is then washed with fresh cold water one or more times, and is finally pumped into a filter-press in order to obtain the compressed yeast. The clear liquid drawn off, as above mentioned, contains a small amount of alcohol in solution, and this is separated from it by distillation. The liquid remaining after distillation of the alcohol is slop or swill suitable for feeding animals, and we propose in some cases to use a part of it in place of water for the first extracting of the soluble parts of the original cereals, as above mentioned.

Heretofore the manufacture of compressed yeast has been an integral part of the distilling or brewing business; but by our improvement we make it independent therefrom. In former methods of yeast-making the greater part of the starch in cereals had to be converted into sugar, while in our process we use raw—that is, unmalted grain—and the greater part of the cereal is reserved for other manufactures, and only the soluble parts are used, which nature stored away in the cereals and which were otherwise wasted. While in former methods the yeast was formed in mashes or wort which were not sterilized and which therefore were apt to be infected with microbes of different kinds, we produce our yeast in a liquid which is thoroughly sterilized, and are thus able to manufacture an exceptionally pure yeast, and which will keep well.

What we claim is—

1. The method of making yeast, which consists in extracting the soluble parts of unmalted starch-bearing materials with a suitable liquid and at a temperature lower than 50° centigrade, thereby leaving the starch intact, separating such extract from the solid material, fermenting the clear wort by itself, thereby forming yeast, and separating the yeast, substantially as described.

2. The method of making yeast, which consists in extracting the soluble parts of unmalted starch-bearing materials with a suitable liquid and at a temperature lower than 50° centigrade, thereby leaving the starch intact, separating such extract from the solid material, sterilizing the extract, separating the coagulum, fermenting the clear wort, thereby forming yeast, and separating the yeast, substantially as described.

This specification signed and witnessed this 30th day of September, 1891.

JACOB BLUMER.

Witnesses:
J. A. YOUNG,
W. PELZER.

This specification signed and witnessed this 1st day of October, 1891.

CHARLES SCHLAGENHAUFER.

Witnesses:
CHARLES M. CATLIN,
J. A. YOUNG.